United States Patent
Walden et al.

(10) Patent No.: US 7,953,866 B2
(45) Date of Patent: May 31, 2011

(54) PROTOCOLS FOR CONNECTING INTELLIGENT SERVICE MODULES IN A STORAGE AREA NETWORK

(75) Inventors: James Mark Walden, Louisville, CO (US); Keith J. Noe, Westminster, CO (US); Jesse B. Willeke, Broomfield, CO (US)

(73) Assignee: MCDATA Corporation, San Jose, CA (US)

( * ) Notice: Subject to any disclaimer, the term of this patent is extended or adjusted under 35 U.S.C. 154(b) by 1470 days.

(21) Appl. No.: 11/386,379

(22) Filed: Mar. 22, 2006

(65) Prior Publication Data

US 2007/0223681 A1 Sep. 27, 2007

(51) Int. Cl.
  G06F 15/16 (2006.01)
  G06F 15/177 (2006.01)
  H04L 12/28 (2006.01)
  H04L 12/56 (2006.01)
(52) U.S. Cl. .................. 709/228; 370/389; 709/220
(58) Field of Classification Search .......... 709/220, 709/228; 370/389
See application file for complete search history.

(56) References Cited

U.S. PATENT DOCUMENTS

| | | | |
|---|---|---|---|
| 5,905,725 | A | 5/1999 | Sindhu et al. |
| 6,049,828 | A | 4/2000 | Dev et al. |
| 6,400,730 | B1 | 6/2002 | Latif et al. |
| 6,427,173 | B1 | 7/2002 | Boucher et al. |
| 6,477,619 | B1 | 11/2002 | Fujimoto et al. |
| 6,504,820 | B1 | 1/2003 | Oliva |
| 6,542,507 | B1 | 4/2003 | Khacherian et al. |
| 6,580,709 | B1 | 6/2003 | Gorshe et al. |
| 6,597,689 | B1 | 7/2003 | Chiu et al. |
| 6,658,504 | B1 | 12/2003 | Lieber et al. |
| 6,665,495 | B1 | 12/2003 | Miles et al. |
| 6,724,757 | B1 | 4/2004 | Zadoloam et al. |
| 6,754,206 | B1 | 6/2004 | Nattkemper et al. |
| 6,775,230 | B1 * | 8/2004 | Watanabe et al. ............. 370/228 |

(Continued)

FOREIGN PATENT DOCUMENTS

EP  1206075 A2  5/2002

(Continued)

OTHER PUBLICATIONS

Ancor Communication, Inc. "Capabilities SW_ILS Proposal", T11/99-612v2, Oct. 11, 1999, 4 pages.*

(Continued)

Primary Examiner — George C Neurauter, Jr.
(74) Attorney, Agent, or Firm — Hensley Kim & Holzer, LLC

(57) ABSTRACT

Implementations are disclosed that provide protocols for connecting an intelligent service module within a storage area network (SAN). The protocols support physical connections between the intelligent service module and a director-level switch of the SAN. In some variations, the intelligent service module may comprise a director service module (DSM), a domain-sharing leaf switch service module (LSSM), or a non-domain-sharing LSSM. The protocols provide for establishing link parameters and negotiating responsibilities between the intelligent service module and the director-level switch. In one configuration, for example, ELP and ELP_ACCEPT frames may be used to establish the link parameters. In another configuration, ESC and ESC_ACCEPT frames may be used to negotiate responsibilities between the intelligent service module and the director-level switch. Other configurations also provide an ownership status of the intelligent service module that is used to determine whether the switch can initiate management of the intelligent service module.

55 Claims, 5 Drawing Sheets

U.S. PATENT DOCUMENTS

| | | | |
|---|---|---|---|
| 6,792,502 B1 | 9/2004 | Pandya et al. | |
| 6,895,433 B1 | 5/2005 | Slater et al. | |
| 6,898,276 B1 | 5/2005 | Millet | |
| 6,904,053 B1 | 6/2005 | Berman | |
| 6,954,437 B1 | 10/2005 | Sylvest et al. | |
| 7,120,728 B2 | 10/2006 | Krakirian et al. | |
| 7,180,866 B1 | 2/2007 | Chartre et al. | |
| 7,275,098 B1 | 9/2007 | Becher et al. | |
| 7,281,044 B2 | 10/2007 | Kagami et al. | |
| 7,301,898 B1 | 11/2007 | Martin et al. | |
| 7,397,788 B2 | 7/2008 | Mies et al. | |
| 7,400,590 B1 | 7/2008 | Rygh et al. | |
| 7,430,164 B2 | 9/2008 | Bare | |
| 7,433,300 B1 | 10/2008 | Bennett et al. | |
| 7,433,326 B2* | 10/2008 | Desai et al. | 370/255 |
| 2001/0047311 A1 | 11/2001 | Singh | |
| 2002/0004912 A1 | 1/2002 | Fung | |
| 2002/0093952 A1 | 7/2002 | Gonda | |
| 2002/0116564 A1 | 8/2002 | Paul et al. | |
| 2002/0163910 A1 | 11/2002 | Wisner et al. | |
| 2002/0194524 A1 | 12/2002 | Wiley et al. | |
| 2003/0033427 A1 | 2/2003 | Brahmaroutu | |
| 2003/0118021 A1 | 6/2003 | Donoghue et al. | |
| 2003/0137941 A1 | 7/2003 | Kaushik et al. | |
| 2003/0158971 A1 | 8/2003 | Renganarayanan et al. | |
| 2003/0179777 A1 | 9/2003 | Denton et al. | |
| 2003/0182422 A1 | 9/2003 | Bradshaw et al. | |
| 2003/0208581 A1 | 11/2003 | Behren et al. | |
| 2003/0233427 A1 | 12/2003 | Taguchi | |
| 2004/0013092 A1 | 1/2004 | Betker et al. | |
| 2004/0024887 A1 | 2/2004 | Grabauskas et al. | |
| 2004/0073676 A1 | 4/2004 | Honma et al. | |
| 2004/0078599 A1 | 4/2004 | Nahum | |
| 2004/0100910 A1* | 5/2004 | Desai et al. | 370/238 |
| 2004/0100980 A1 | 5/2004 | Jacobs et al. | |
| 2004/0141521 A1 | 7/2004 | George | |
| 2004/0218531 A1 | 11/2004 | Cherian et al. | |
| 2005/0036499 A1 | 2/2005 | Dutt et al. | |
| 2005/0050240 A1 | 3/2005 | Wilkins et al. | |
| 2005/0091353 A1 | 4/2005 | Gopisetty et al. | |
| 2005/0094649 A1 | 5/2005 | Varanasi et al. | |
| 2005/0105560 A1 | 5/2005 | Mann et al. | |
| 2005/0108444 A1 | 5/2005 | Flauaus et al. | |
| 2005/0152316 A1* | 7/2005 | Liao et al. | 370/335 |
| 2005/0182838 A1 | 8/2005 | Sheets et al. | |
| 2005/0203647 A1 | 9/2005 | Landry et al. | |
| 2005/0213560 A1 | 9/2005 | Duvvury | |
| 2005/0231462 A1 | 10/2005 | Chen | |
| 2005/0281196 A1 | 12/2005 | Tornetta et al. | |
| 2006/0023751 A1 | 2/2006 | Wilson et al. | |
| 2006/0034302 A1 | 2/2006 | Peterson | |
| 2006/0036822 A1 | 2/2006 | Kaji | |
| 2006/0069824 A1 | 3/2006 | Hodder | |
| 2006/0092853 A1 | 5/2006 | Santoso et al. | |
| 2006/0182041 A1 | 8/2006 | Graves | |
| 2006/0221813 A1 | 10/2006 | Scudder | |
| 2007/0058620 A1* | 3/2007 | Willeke et al. | 370/386 |
| 2007/0061813 A1* | 3/2007 | Beal et al. | 718/105 |
| 2007/0083625 A1* | 4/2007 | Chamdani et al. | 709/223 |
| 2007/0140130 A1 | 6/2007 | Valdes et al. | |
| 2007/0147364 A1 | 6/2007 | Palacharla et al. | |
| 2007/0248029 A1 | 10/2007 | Merkey et al. | |

FOREIGN PATENT DOCUMENTS

| | | | |
|---|---|---|---|
| EP | 1528730 | A2 | 5/2005 |
| WO | 200171524 | A1 | 9/2001 |
| WO | 200180013 | A1 | 10/2001 |
| WO | 2005004408 | A1 | 1/2005 |
| WO | 2005024557 | A2 | 3/2005 |

OTHER PUBLICATIONS

Snively, Bob et al. "Fibre Channel: Switch Fabric—4 (FC-SW-4), Revision 7.6", INCITS Working Draft, American National Standard for Information, Nov. 22, 2005, 329 pages.*

"BCM56504 24-Port GbE Multilayer Switch with Four 1-GbE/HiGig+™ Ports," http://www.broadcom.com/products/Enterprise-Networking/Gigabit-Ethernet-Switching-Products/BCM56504, (downloaded Dec. 11, 2006).

"BCM56504 Product Brief—24-Port BgE Multilayer Switch with Four 10 GbE/HiGig+™ Ports," Broadcom Corporation, 2006.

"Broadcom announces StrataXGS®III—The World's First Integrated Ethernet Switch Solutions Featuring Embedded Security, IPv6 Routing and Wireless LAN Support—First Multi-Layer Switch with 24 Gigabit Ethernet (GbE) Ports and Four 10GbE Ports," http://www.broadcom.com/press/release.php?id=665681&printable+1, Broadcom Corporation, 2005, (downloaded Nov. 17, 2006).

AVICI Systems, Inc., The Use of Composite Links to Facilitate the Creation of a New Optical Adaptation Layer White Paper (visited Dec. 14, 2001) <http://avici.com/technology/whitepapers/Composite_links.pdf>.

Baltazar, Henry, "Deciphering NAS, SAN storage wars," EWEEK, Apr. 9, 2001, p. 26, Ziff Davis Publishing, Inc., New York, New York, United States of America.

Berkowitz, Howard, Designing Routing and Switching Architectures; Chapter 9, connection-oriented switching, pp. 507-511, 1999, Network Architecture and Development Series, MacMillan Technical Publishing.

CD/9000 Channel Director—Product Detail by CNT, at http://web.archive.org/web/20050204044510/www.cnt.com/products/switching/cd9000, 2 pages, © 2003-2005, printed Jul. 19, 2006.

Cisco MDS 9000 Family Networked Storage Solutions for Small and Medium-Sized Businesses—At-a-Glance, 2-page product brochure, © 1992-2005 Cislco Systems, Inc.

Cisco MDS 9000 Family of Multilayer Directors and Fabric Switches, at http://www.cisco.com/en/US/products?ps6446/prod_brochure0900aecd80355d56.html, 3 pages, © 1992-2005, printed Jul. 19, 2006.

CNT Introduces New Generation Storage Networking Infrastructures, at http://web.archive.org/web/20050206034944/www.cnt.com/cnt/news/pr/2004/07-19-00, 3 pages, © 2003-2005, printed Jul. 19, 2006.

DOT Hill Systems Corp., "SAN Tutorial" (visited Apr. 3, 2001) <http://www.the-storage-in.com/topic01.html>.

DStar: CNT Remains FICON Leaser with UltraNet Multi-Service Director, at http://www.taborcommunications.com/dsstar/04/1109/109456.html, 2 pages, printed Jul. 19, 2006.

Dunstan, Adam et al., Reliable Backbone Bandwidth Using Composite Links White Paper (visited Dec. 14, 2001) <http://www.avici.com/technology/whitepapers/reliable_backbone.pdf>.

European Search Report, prepared by the European Patent Office for European Application No. EP 06118654, Jun. 28, 2007, 3 pages.

European Search Report, prepared by the European Patent Office for European Application No. EP 06124606.2, dated Sep. 25, 2007, 3 pages.

Extended European Search Report, prepared by the European Patent Office for European Application No. EP 06121329, dated Feb. 27, 2009, 8 pages.

FC/9000 Fibre Channel/FICON Director—Product Detail by CNT, at http://web.archive.org/web/20050205081213/www.cnt.com/products/switching/fc9000, 3 pages, © 2003-2005, printed Jul. 19, 2006.

Fetters, Dave, "Storage Options," Network Computing, May 15, 2000 <http://www.networkcomputing.com/1109/1109ws13.html>.

Fetters, Dave, "The Fabric of Your Life," Network Computing, May 15, 2000 <http://www.networkcomputing.com/1109/1109ws12.html>.

Fetters, Dave, "Why a SAN," Network Computing, May 15, 2000, <http://www.networkcomputing.com/1109/1109ws1.html>.

Fibre Channel Systems, "Overview of the Technology" (visited Apr. 3, 2001) <http://www.fibrechannel.com/technology/overview.html>.

Goldworm, Barb, "The Difference Between SANs and NAS," NETWORKWORLDFUSION, Oct. 2, 2000 <http://www.nwfusion.com/newsletters/stor/2000/1002stor1.html>.

GR-253-CORE, Synchronous Optical Network (SONET) Transport Systems: Common Generic Criteria, Sep. 2000, Telcordia Technologies, Issue 3, Chapter 3.

IBM Tivoli Storage Manager—Product Overview, at http://www-306.ibm.com/software/tivoli/products/storage-mgr/, updated Jul. 13, 2006, 3 pages, printed Aug. 9, 2006.

IBM Tivoli Storage Manager for Storage Area Networks—Product Overview, at http://www-306.ibm.com/software/tivoli/products/storage-mgr-san/, 2 pages, updated Dec. 13, 2006, printed Aug. 9, 2006.

IBM, Inc., "SAN Basics" (visited Apr. 3, 2001) <http://www.storage.ibm.com.ibmsan/basics.html>.

U.S. Appl. No. 09/943,842, Applicant Joseph Chamdani et al.

U.S. Appl. No. 09/944,425, Applicant Joseph Chamdani et al.

Zeichick, Alan, "4 Storage Area Networks," INTERNETWEEK, Sep. 25, 2000 <http://www.internetwk.com/reviews00/rev092500.html>.

* cited by examiner

PROTOCOLS FOR CONNECTING INTELLIGENT SERVICE MODULES IN A STORAGE AREA NETWORK

CROSS-REFERENCE TO RELATED APPLICATIONS

This application is related to pending U.S. patent application Ser. No. 11/239,954 entitled "Federated Management of Intelligent Service Modules" by Joseph Chamdani et al. on Sep. 29, 2005 and Ser. No. 11/216,903 entitled "Management of a Switch Fabric Through Functionality Conservation" and filed by Jesse B. Willeke et al. on Aug. 31, 2005, both of which are hereby incorporated into this application by reference in their entirety.

TECHNICAL FIELD

The invention relates generally to storage area networks, and more particularly to protocols for connecting intelligent service modules in a storage area network.

BACKGROUND

A storage area network (SAN) may be implemented as a high-speed, special purpose network that interconnects different kinds of data storage devices with associated data servers on behalf of a large network of users. Typically, a storage area network includes high-performance switches as part of the overall network of computing resources for an enterprise. The storage area network is usually clustered in close geographical proximity to other computing resources, such as mainframe computers, but may also extend to remote locations for backup and archival storage using wide area network carrier technologies. Fibre Channel networking is typically used in SANs although other communications technologies may also be employed, including Ethernet and IP-based storage networking standards (e.g., iSCSI, FCIP (Fibre Channel over IP), etc.).

In one configuration, switches are assembled in a chassis using a selection of blade components of a SAN switch. Individual blade components are fitted into slots in the chassis and connected to a chassis backplane for interconnectivity. For example, line card blades, switch blades, and other blade components can be inserted into a chassis to provide a scalable and customizable storage network switch configuration. Typically, the blades are controlled by shared control processors (e.g., one active and one backup), powered by one or more shared power supplies through the backplane, and cooled by a shared set of cooling fan trays.

Fabric-based intelligent services, such as routing, virtualization, and distance services, may be added to a switch to enhance the performance, scalability, and features of the switch. For example, a wide area connectivity service blade can be inserted into an open slot in the chassis to provide fibre channel over IP bridging. In this fashion, the intelligent services can be managed as part of the switch.

However, adding such services as blades in a chassis presents significant limitations. A chassis has a limited number of slots, and a SAN administrator may not have an open slot in which to add an intelligent service blade. Even with an available slot, a service blade adds additional risk to the core switch, reducing the overall mean-time-between-failures (MTBF). Further, intelligent service blades tend to run hotter than core switch blades and therefore require placement in the better-cooled slots in the chassis. A chassis backplane also has power and signaling constraints that can restrict the scalability of a switch, particularly when an intelligent services blade is added to the chassis.

SUMMARY

Implementations described and claimed herein address the foregoing problems by providing protocols for connecting an intelligent service module within a storage area network (SAN). The protocols support physical connections between the intelligent service module and a director-level switch of the SAN. In some variations, the intelligent service module may comprise a director service module (DSM), a domain-sharing leaf switch service module (LSSM), or a non-domain-sharing LSSM. The protocols provide for establishing link parameters and negotiating responsibilities between the intelligent service module and the director-level switch. In one configuration, for example, ELP and ELP_ACCEPT frames may be used to establish the link parameters. In another configuration, ESC and ESC_ACCEPT frames may be used to negotiate responsibilities between the intelligent service module and the director-level switch. Other configurations also provide an ownership status of the intelligent service module that is used to determine whether the switch can initiate management of the intelligent service module.

In some implementations, articles of manufacture are provided as computer program products. One implementation of a computer program product provides a computer program storage medium readable by a computer system and encoding a computer program. Exemplary storage media may include without limitation magnetic and optical disks, EEPROMS, flash memory, RAM, and other storage devices.

Other implementations are also described and recited herein.

DETAILED DESCRIPTIONS

The use of intelligent service modules in a storage area network brings a combination of new management concepts and capabilities to traditional switching products. Intelligent service modules can be located external to a switch chassis and communicate with the switch components in the chassis via an external cable using a communications transport mechanism between the switch components and the intelligent service modules. In one implementation, for example, IPFC (Internet Protocol over Fibre Channel) is employed as the transport mechanism between a switch and an intelligent service module. The intelligent service module is cabled to a switch through fibre channel ports in each device, such that the communications between the intelligent service module and the port module are "in-band" communications relative to the data communications of the switching network.

Each intelligent service module can be managed within the same logical domain as the switch (i.e., domain-sharing) or may be managed independently from the switch (i.e., non-domain-sharing). In a domain-sharing configuration, for example, the switch can handle much of the management of the intelligent service module and otherwise forwards management communications received by the switch from the management software to the intelligent service module. Domain-sharing also conserves Domain IDs, allows the intelligent service module to appear as a logical part of the switch in which the module's ports are an extension of the switch ports, and reduces fabric-wide disruptions when an intelligent service module is added to or removed from the director. Likewise, an intelligent service module can be managed in-band or out-of-band from the switch. Where the intelligent service module is managed in-band, for example, a traditional physical Ethernet (i.e., out-of-band) connection between management software and each intelligent service module can be omitted.

Generally, a switching fabric involves a collection of interconnected switches that are capable of communicating among them. In contrast, a SAN can comprise one or more fabrics.

Figure 1:
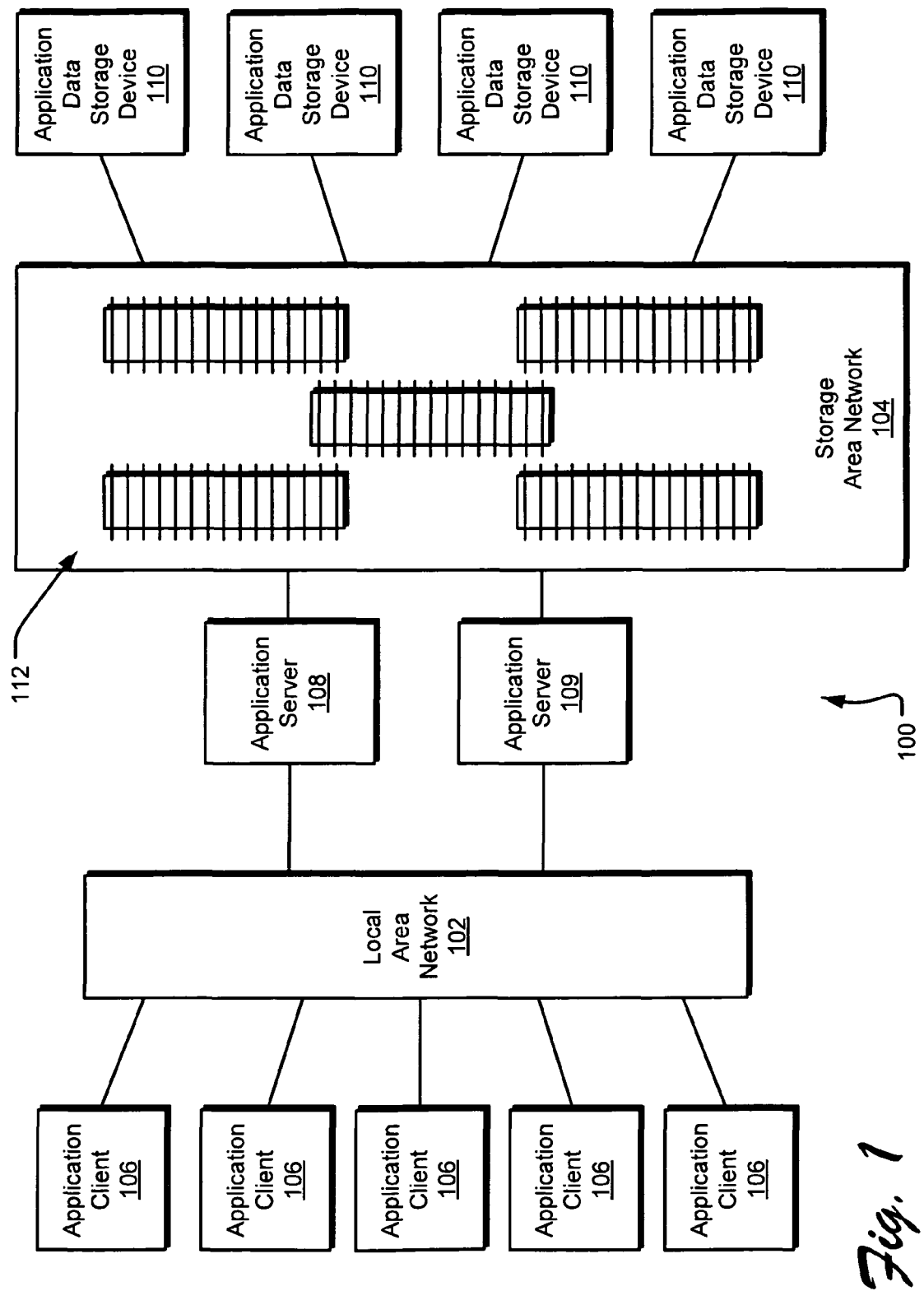
FIG. 1 illustrates an exemplary computing and storage framework including a local area network (LAN) and a storage area network (SAN).

FIG. 1 illustrates an exemplary computing and storage framework 100 including a local area network (LAN) 102 and a storage area network (SAN) 104. Various application clients 106 are networked to application servers 108 and 109 via the LAN 102. Users can access applications resident on the application servers 108 and 109 through the application clients 106. The applications may depend on data (e.g., an email database) stored at one or more of the application data storage devices 110. Accordingly, the SAN 104 provides connectivity between the application servers 108 and 109 and the application data storage devices 110 to allow the applications to access the data they need to operate. It should be understood that a wide area network (WAN) may also be included on either side of the application servers 108 and 109 (i.e., either combined with the LAN 102 or combined with the SAN 104).

With the SAN 104, one or more switches 112 provide connectivity, routing and other SAN functionality. Some such switches 112 may be configured as a set of blade components inserted into a chassis or as rackable or stackable modules. The chassis has a back plane or mid-plane into which the various blade components, such as switching blades and control processor blades, may be inserted. Rackable or stackable modules may be interconnected using discrete connections, such as individual or bundled cabling.

In the illustration of FIG. 1, at least one switch 112 is coupled to at least one external intelligent service module. Rather than being inserted into an open slot in the switch chassis, the intelligent service module is connected to the switch 112 via an optical or wired cable. The intelligent service module can nevertheless be managed within the same logical domain as the switch without the need for a separate out-of-band connection. In addition, the intelligent service module can be "attached" or added to the switch without disrupting operation of the switch (e.g., to move blades or make chassis slots available).

Figure 2:
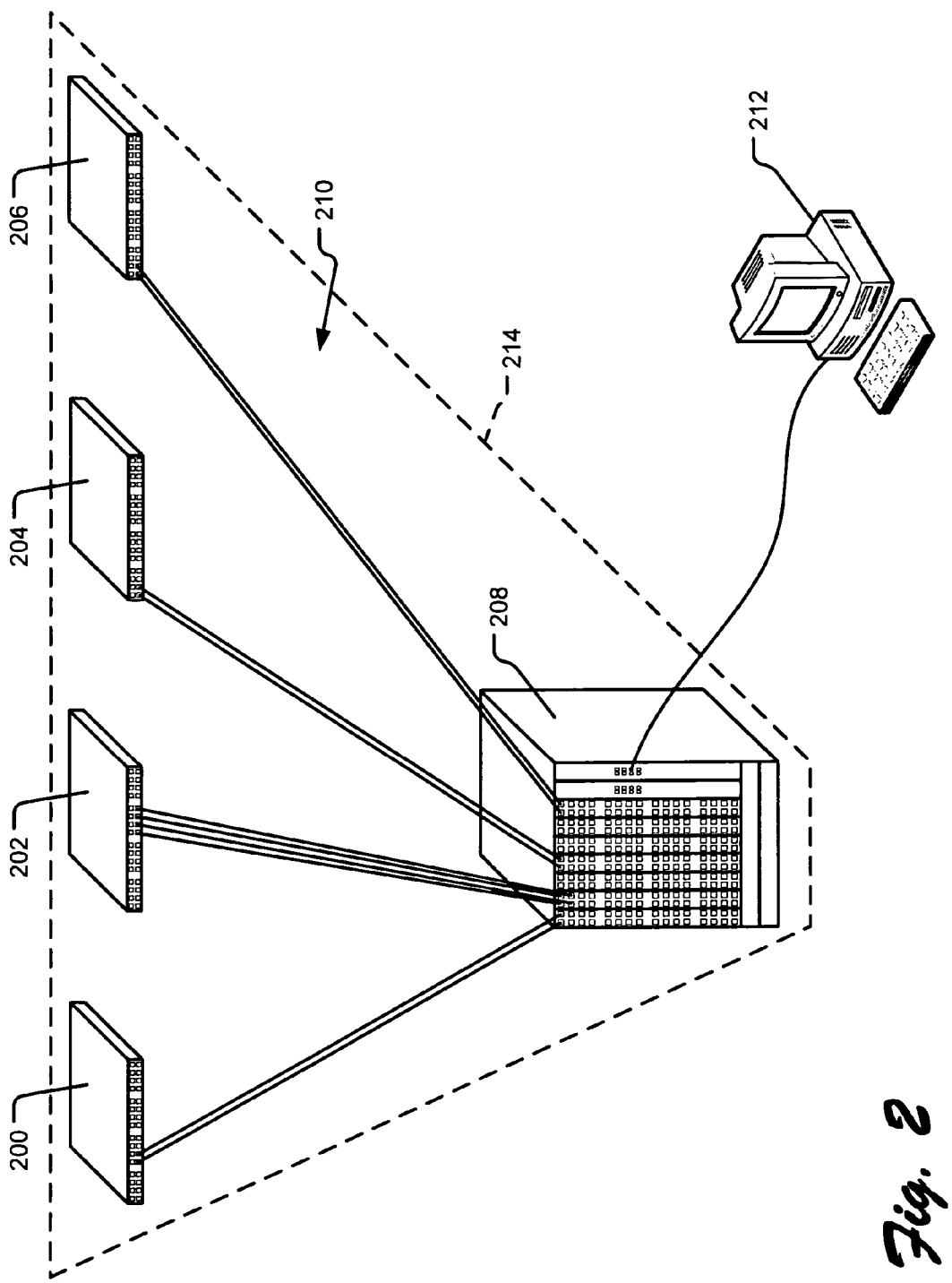
FIG. 2 illustrates exemplary intelligent service modules connected to a chassis-based director-level switch.

FIG. 2 illustrates exemplary multiple intelligent service modules 200, 202, 204, and 206 connected to a chassis-based director-level switch 208. Fibre channel ports of each intelligent service module 200, 202, 204, and 206 are coupled to fibre channel ports in the switch 208 via optical cabling 210 (although wired cabling, such as copper cabling, may alternatively be employed). In the configuration shown in FIG. 2, the intelligent service modules 200, 202, 204, and 206, are external to the director-level switch 208 and do not directly consume port slots of the switch 208 or the bandwidth dedicated to those slots. Each illustrated intelligent service module also has separate power supplies and cooling mechanisms, although individual intelligent service modules may share power supplies and/or cooling mechanisms in alternative configurations.

A management client 212 is connected to the switch 208 via an Ethernet connection. The management client 212 provides user control and monitoring of various aspects of the switch and attached devices, including without limitation, zoning, security, firmware, routing, addressing, etc. The management client 212 may identify the managed switch 208 using a domain ID specific to the switch or, in a domain-sharing configuration, a domain ID shared with one or more of the attached intelligent service modules 200, 202, 204, and 206. In addition, the management client 212 may identify the managed switch using a World Wide Name (WWN) or an IP address. In cases where a switch implements multiple virtual fabrics, the management client may use more than one domain ID in its communications with the switch. The management client 212 therefore can send a management request referencing the domain ID of the switch, an intelligent service module identifier, and a port identifier of an attached intelligent service module, and the switch will perform whatever portion of the requested management function it is capable of performing (if any) and forward instructions to the intelligent service module possessing the referenced port for additional activity, if necessary.

Despite being external from the chassis, the intelligent service modules 200, 202, 204, and 206 may be configured to be managed within the same logical domain 214 as the director-level switch 208 (i.e., share the domain ID of the director-level switch 208) or may be assigned a domain ID independent from the ID assigned to the switch 208. Each intelligent service module may also be configured to be independently managed or to utilize federated management by the switch 208. In one configuration of a SAN, for example, a director services module (DSM) supports domain-sharing with the switch 208 and federated management by the switch. A leaf switch services module (LSSM), alternatively, is managed independently by from the switch. An LSSM, however, may support domain-sharing with the switch (i.e., a domain-sharing LSSM) or may support independent domain IDs than the ID assigned to the switch 208 (i.e., a non-domain-sharing LSSM). An LSSM may share domain IDs (e.g., proxy IDs) with other LSSMs to conserve domain IDs within the fabric even if they do not share domain IDs with the switch 208.

In order to support these states, one configuration of a Fibre channel inter-switch link (ISL) connection may comprise a port state that supports domain-sharing (e.g., a "D_Port state") between the director-level switch 208 and one of the intelligent service modules 200, 202, 204, and 206 and an alternative port state that does not support domain sharing between the director-level switch 208 and one of the intelligent service modules 200, 202, 204, and 206 (e.g., an "E_Port state"). A DSM, for example, would be coupled to the switch 208 via an ISL having a D_Port state, while an LSSM may be coupled to the switch 208 via an ISL having either a D_Port state or an E_Port state depending on whether the LSSM shares a domain ID with the switch or is assigned a domain ID separate from the domain ID of the switch, respectively.

An intelligent service module that shares the logical domain 214 of the director-level switch 208 does not consume additional domain IDs of the SAN and can be managed in-band as an extension of the switch 208 (e.g., via a D_Port state of the ISL coupling the intelligent service module and the switch). Where one or more of the intelligent service modules 200, 202, 204, and 206 shares the logical domain 214 of the director-level switch 208, the switch 208 is attributed with a domain ID and each domain-sharing intelligent service module is attributed with a unique intelligent service module identifier within the logical domain 214 associated with the domain ID. In addition, one or more ports of each domain-sharing intelligent service module can be attributed with a unique port identifier within the intelligent service module identifier. In this manner, the management client 212 can uniquely identify domain-sharing individual intelligent service modules and their ports within the logical domain 214 of the switch 208 and the switch can handle some portion of the management requests while forwarding certain management functions to the appropriate intelligent service module for processing, when necessary.

Once one of the intelligent service modules shares a domain ID with the director-level switch 208 (e.g., as a domain-sharing DSM or LSSM), the module is no longer a directly hardware-routed destination for domain controller frames. It also cannot directly send out domain controller frames to remote switches because there is no way to route back the response. The director-level switch intercepts all domain controller frames directed to a domain-sharing intelligent service module (e.g., a DSM or domain-sharing LSSM). The switch also intercepts all domain controller frames sent to proxy domains it is controlling and assumes that frames sent to its domain have to be forwarded to DSMs or LSSMs sharing its domain. In addition, the switch 208 intercepts all incoming domain controller frames (including responses) from the DSMs and domain-sharing LSSMs within it logical domain regardless of the destination domain ID of the frames. For frames received from the fabric, the director-level switch 208 either responds to the frames directly on behalf of one of its associated DSMs or domain-sharing LSSMs (assuming it has the appropriate information cached locally to satisfy the request) or forwards a copy of the message to one or more of the DSMs and domain-sharing LSSMs sharing the same domain ID. If the switch 208 forwards a copy of a message requiring a response, it forwards the message pretending to be the source, collects any responses, and sends the response back to the originator on behalf of its domain-sharing DSMs and LSSMs. For frames received from its associated domain-sharing DSMs and LSSMs, the director-level switch 208 intercepts the frames and forwards them to the target destination. The director saves context information in order to route any response back to the correct DSM or LSSM.

Where one or more of the intelligent service modules 200, 202, 204, and 206 is configured as a module that does not share the domain ID of the switch 208 (e.g., via an E_Port state of the ISL coupling the module and the switch), however, the management client 212 can uniquely identify the intelligent service module (e.g., an LSSM) by its domain ID independently of the director-level switch 208. Further, the management client 212 may also uniquely identify one or more ports of the intelligent service module via a unique port identifier attributed to the intelligent service module within the domain ID of the intelligent service module. Where the intelligent service module shares a proxy domain ID with other devices (e.g., a proxy domain ID shared between multiple LSSMs), the intelligent service module may be assigned a unique intelligent service module identifier within the proxy domain ID, and the unique port identifier(s) of the intelligent service module may be located within the intelligent service module identifier. The management client 212 may thus uniquely identify the intelligent service module and one or more of its ports within the logical domain of the proxy domain ID.

In the illustrated implementation, the intelligent service module 200 represents a virtualization intelligent service module (VSM) that provides Layer 4 SCSI/block storage services. The VSM 200 provides virtualization services and flexible switch connectivity. Another intelligent service module 202 in the illustration of FIG. 2 represents a routing intelligent service module (RSM) that provides Layer 3 SAN routing services. The RSM 202 provides inter-fabric routing between physical and virtual fabrics within the SAN. Yet another intelligent service module 204 in FIG. 2 represents a WAN intelligent service module (WSM) that can provide wide area connectivity, including iFCP or FCIP bridging, FICON tunneling, and streaming, such as fast write, compression, encryption, etc. Further, the intelligent service module 206 in FIG. 2 represents an aggregation intelligent service module (ASM) that aggregates end devices (e.g., host initiators or storage targets) to the attached switch 208, thereby simplifying the core-edge topology into a collapsed core that is a logical part of the switch 208.

Figure 3:
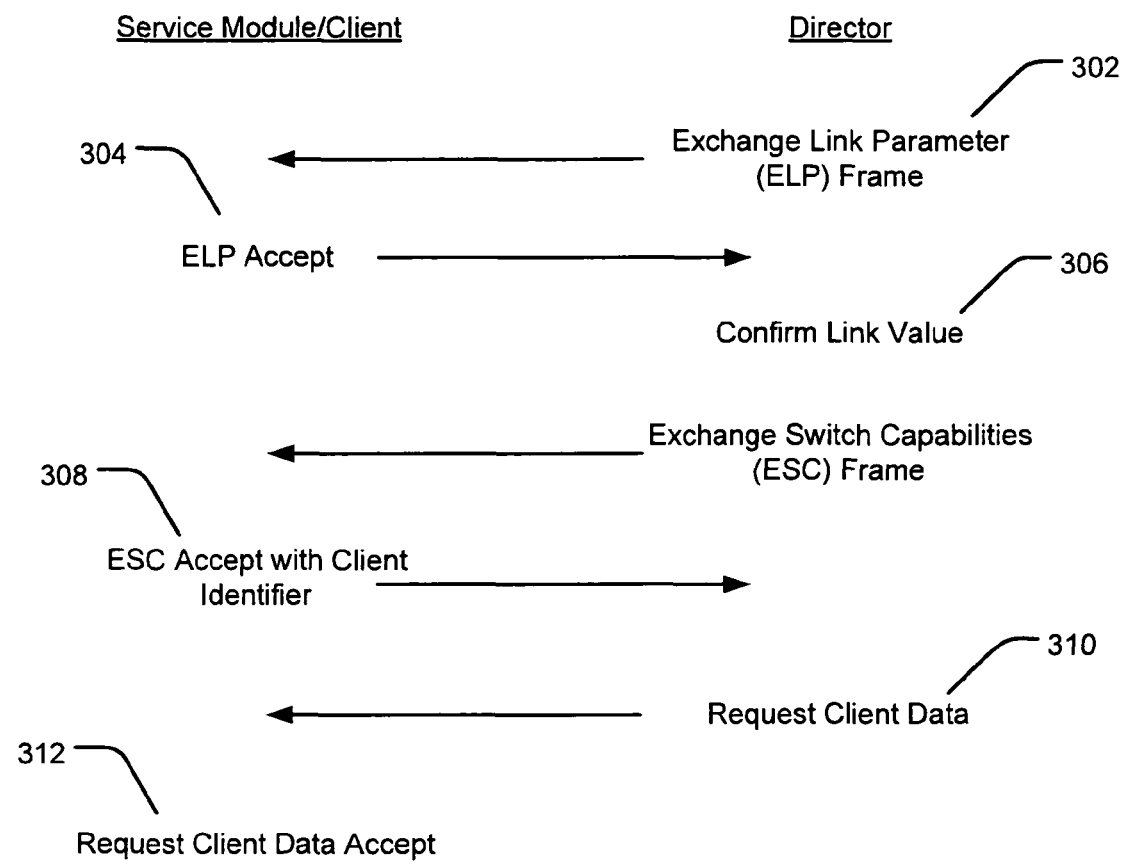
FIG. 3 illustrates an exemplary exchange of information between a director-level switch and an intelligent service module to establish a physical connection between the switch and the module.

FIG. 3 illustrates an exemplary protocol 300 for establishing a physical connection between a director-level switch (i.e., the director) and an intelligent services module. In this protocol 300, after an intelligent service module is connected to the director, the director issues an exchange link parameter (ELP) frame 302. The ELP frame comprises communication exchange parameters of the director such as timeout values and the like. The intelligent services module receives the ELP frame and assumes the parameters issued by the director. The intelligent service module then issues an ELP_ACCEPT command 304 to the director. The ELP_ACCEPT command, for example, confirms the communication link parameters back to the director. The director receives the ELP_ACCEPT command 304, and confirms that the intelligent service module has returned the correct communication link parameters to the director. If the parameters match those of the director, the director continues the communication with the intelligent service module; otherwise the director severs the communication link and waits for another intelligent service module to be attached to the fabric.

If the intelligent service module has confirmed the correct communication link parameters, however, the director then sends an exchange switch capabilities (ESC) frame 306 back to the intelligent service module. The ESC frame 306, for example, comprises attributes supported by the particular director. In one variation, for example, the ESC frame 306 may comprise domain sharing (D-port), federated management, leaf master, and/or standard switch capabilities as supported attributes of the director. Of course, the host director may support a subset of these attributes and/or additional attributes.

The intelligent service module then determines whether the attributes of the module were identified as supported attributes of the director. Where the intelligent service module comprises a director service module (DSM) having D_port protocol and federated management capabilities, for example, the DSM determines whether the director identified itself as domain-sharing and federal management capable in the ESC frame 306. A leaf switch, however, will determine if the director has identified itself as leaf master capable in the ESC frame 306. In some variations, for example, if the attributes identified by the director in the ESC frame 306 fail to identify a primary capability (e.g., domain-sharing and federated management capable), the intelligent service module may determine whether the switch supports a secondary capability also supported by the intelligent service module (e.g., a legacy fabric shortest path first (FSPF) routing attribute that determines routes from a switch and implies support for E_Ports and standard routing protocols). If none of the attributes identified by the director in the ESC frame 306 are supported by the intelligent service module, the intelligent service module rejects the ESC frame and the communication is severed.

If the director supports the predetermined attributes of the intelligent service module, the module generates an ESC_ACCEPT command 308 and sends that command to the director. Where the director identified more than one attribute in the ESC frame 306, for example, the ESC_ACCEPT command 308 may include a client identifier that identifies at least one attribute of the director that is shared by the intelligent service module. The shared attribute of the switch and the intelligent service module thus determines the communication protocol used for communication between the director and the module.

The director receives the ESC_ACCEPT command 308 and issues a request client data command 310 to the intelligent service module. The intelligent service module then receives the Request Client Data command 310 and responds with a Request_Client_Data_Accept command 312. Where the intelligent service module has selected domain sharing and federated management capabilities of the director, for example, the director's request client data command 310 may comprise a Request_DSM_Data (RDD) command. The intelligent service module, in turn, issues an RDD_ACCEPT command and identifies module data, such as a type of intelligent service module, a number of ports, and an ownership status. As further discussed below, the intelligent service module then relinquishes control to the federated management of the director.

Figure 4A:
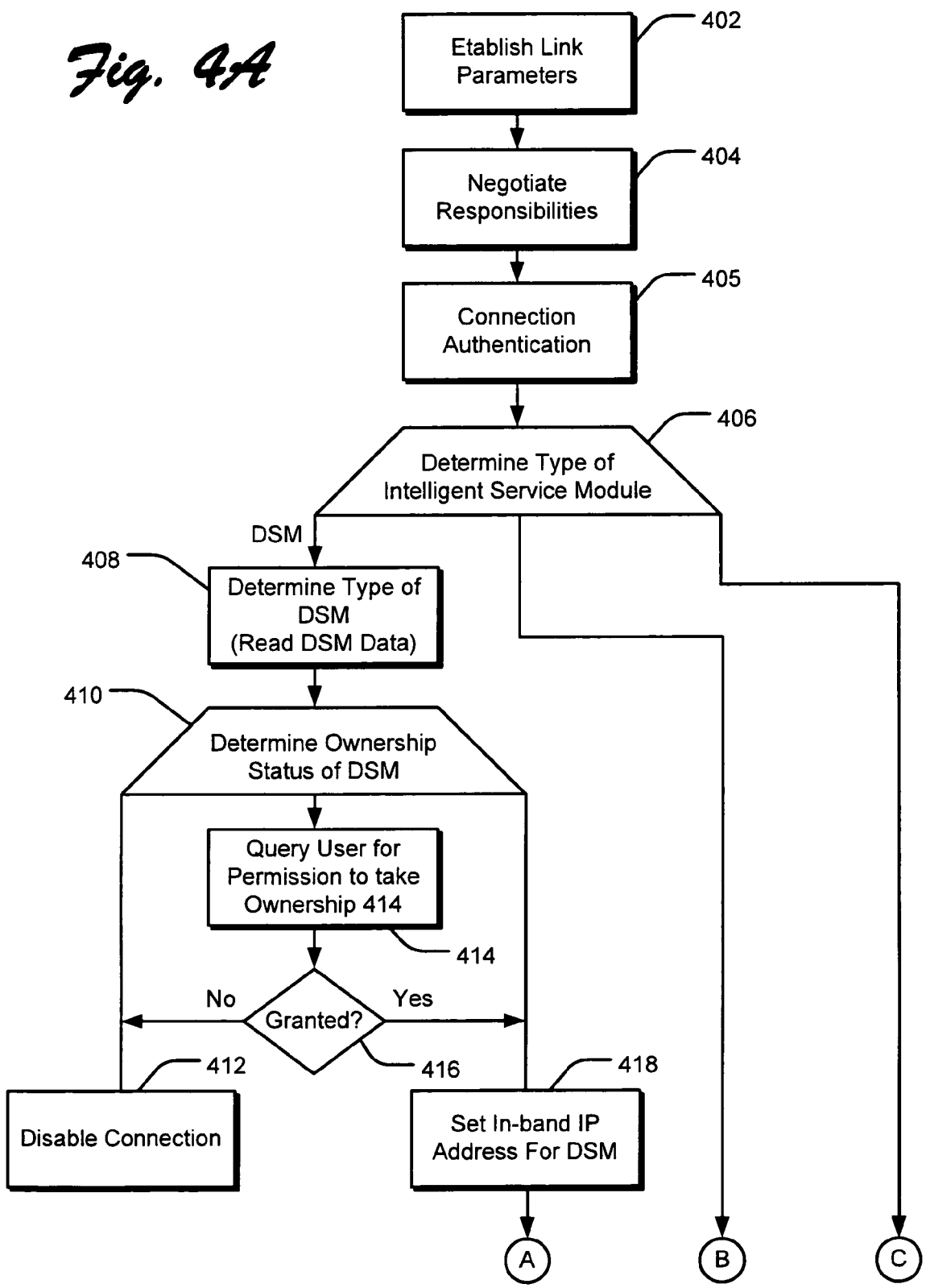
FIGS. 4A and 4B illustrate an exemplary method of establishing a physical connection between a director-level switch and an intelligent service module.
Figure 4B:
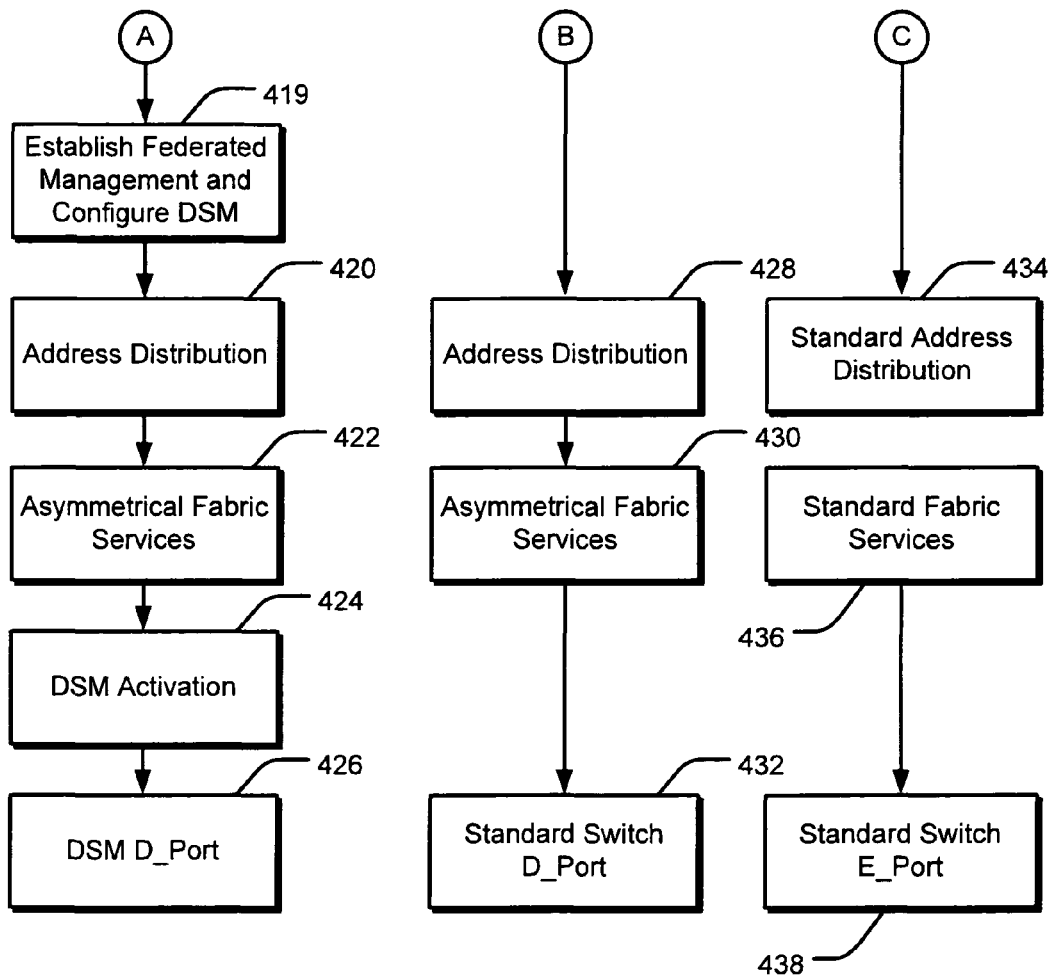

FIGS. 4A and 4B illustrate a flow diagram of an exemplary method 400 of establishing a physical connection between a director-level switch (i.e., the director or host director) and an intelligent services module. In this example, the intelligent service module and the switch establish link parameters in the establishing operation 402. As described above with reference to FIG. 3, the link parameters are established by the director sending the intelligent service module an exchange link parameters (ELP) frame, the intelligent service module assuming the link parameters received in the ELP frame and sending a reply ELP_ACCEPT frame back to the director, and the director confirming the link values received in the ELP_ACCEPT frame.

When a DSM is connected to a director-level switch of a SAN, for example, the DSM and the director are initially in a default state (e.g., "No_HD_Connection" for the DSM and "No_DSM_Connection" for the host director) that indicate that there are no active or pending connections of the DSM and the host director. The DSM and the HD enters the default state from any other state when all D_Port state ISL connections are disconnected, when all ports of the DSM revert to the initial state because the DSM processed a new ELP frame setting new link parameters, or as part of a SAN online processing sequence. While in this state, a new connection is detected by the host director and the DSM. The host director and DSM, for example, may use Link Level ELP and ESC protocols to detect a new connection between the DSM and the host director. In one configuration, for example, the DSM waits for a host director to initiate link level protocols via an ELP frame, and the director initiates communication by issuing the ELP frame. Connections between the DSM and the director may be established via a unique identifier for each, such as a WWN. When a new connection between the DSM and the director is detected, the DSM and the director enter new states (e.g., a "New_HD_Connection" state for the DSM and a New_DSM_Detected state for the host director). Similar connection states could also be used for an LSSM or even a standard switch connecting to the director.

Once the intelligent service module and the director have detected each other and established link parameters via the ELP and ELP_ACCEPT frames, the intelligent service module and the director negotiate responsibilities for the module and the director in the negotiating operation 404. As described above with reference to FIG. 3, the responsibilities can be negotiated between the intelligent service module and the director via an ESC frame issued by the director and an ESC_ACCEPT frame returned from the intelligent service module. The ESC frame indicates the attributes supported by the director (e.g., via attribute flags of the ESC frame). Thus, when the intelligent service module receives this frame, the module first determines whether the director is capable of supporting it. If the director is not capable of supporting the particular type of intelligent service module, the module may reject the ESC frame prompting the director to sever the communication. If the director is capable of supporting the intelligent service module, however, the module responds with an ESC_ACCEPT frame that identifies which attributes of the director that are required to support the module.

In one configuration, for example, the ESC frame of the director may include attribute flags identifying at least one of the following attributes: (1) Federated Management, (2) Leaf Routing, (3) Domain ID Sharing, and (4) Server/Provider. Where an intelligent service module configured as a DSM is connecting to the director, for example, the ESC frame issued by the director may include flags identifying all or a portion of the supported attributes (such as those listed above), and the DSM would respond with an ESC_ACCEPT frame identifying itself as a Client and further including supported attribute flags such as Federated Management, Domain ID Sharing, and Leaf Routing. An intelligent service module configured as an LSSM, however, may receive the same ESC frame and respond, in addition to identifying itself as a Client, with attribute flags identifying support attributes such as Leaf Routing and Domain ID Sharing for a domain sharing LSSM or a Leaf Routing support attribute for a non-domain sharing LSSM. If a regular switch is connected to the director, however, the switch would only respond with attribute flags selecting a standard routing protocol (e.g., an FSPF routing protocol). If the ESC frame issued by the director does not provide an attribute required by the configuration of the intelligent service module, however, the module may reject the ESC frame prompting the director to sever the communication.

After the intelligent service module and the director have negotiated responsibilities between them in the negotiating operation 404, the director may initiate an authentication challenge to the DSM in authenticating operation 405. In one configuration, for example, D_Ports can only be authenticated if the DSM has been configured with authentication secrets from a prior connection. For new DSM connections, however, user acceptance may be required as an alternative to an authentication challenge.

After the director has successfully authenticated the intelligent service module in the authenticating operation 405, the director determines the type of the intelligent service module connected to the director (e.g., a DSM, a domain-sharing LSSM, or a standard switch connection) in a determining operation 406. If the module is a DSM, for example, the method 400 proceeds to determining operation 408, where the director then determines the type of DSM. For example, the director may send a request to the new DSM for its identification data.

The director then begins the process of establishing federated management over the DSM. As part of this process of establishing federated management, the director first determines the ownership status of the DSM in a determining operation 410. If the DSM is actively owned by another director, for example, the attempt to establish a connection between the director and the DSM is rejected in operation 412 and the process of connecting the DSM to the director terminates. If the DSM is actively or previously owned by the current director, however, the attempt to establish the connection continues, and the method proceeds to setting operation 418, discussed below. If the DSM is un-owned or previously owned by another director, the process proceeds to querying operation 414 to query a user (e.g., via the management client) for permission to take ownership of the DSM. This provides a security operation to prevent an unauthorized DSM from being installed on the SAN without permission. If permission to establish federated management over the DSM is denied by the user, the method branches in a determining operation 416 to the rejecting operation 412 and the process of connecting the DSM to the director terminates. If the determining operation 416 determines that permission was granted for the director to establish federated management over the DSM, however, the method branches to setting operation 418.

In the setting operation 418, an in-band IP address for the DSM is set by the director. In this operation, for example, the director sends a command (e.g., a Set_IP_Address_ILS command) to the DSM and waits for a response. If the DSM accepts the command, it indicates that the director has established ownership over the DSM and is ready to establish a federated management TCP/IP connection. If the DSM rejects the command (e.g., where another director was faster with its request to claim ownership of the DSM), however, the director will transition back to the New_DSM_Detected state, described above with respect to establishing operation 402, to attempt to start the process over. If the attempt to set the IP address of the DSM fails multiple times over all available ports, the director may transition to a failed state (e.g., a DSM_Connection_Failed state).

After the director has successfully set the IP address of the DSM, the method proceeds to a configuring operation 419 in which Federated Management of the DSM is established and used to configure the DSM. In the configuring operation 419, the director uses the IP address to establish a federated management TCP/IP connection path, configures the DSM, and notifies the management client fabric services when the process has been completed. Then, in the address distribution operation 420, the state will transition to a control state (e.g., a Fabric_Services_Control state) and the director will take control of the DSM to establish domain sharing with the DSM by completing the connection of the DSM to the director via the D_Port state of the ISL connection. In the control state, the fabric services will complete all required Fabric Services protocols, such as a fabric initialization process used to assign domain and area IDs to the DSM and a zoning process for the fabric. Once the fabric services processes are complete, the DSM is activated and host/module operation is initiated in Asymmetrical Fabric Services operation 422.

Once the Asymmetrical Fabric Services operation 422 executes to complete fabric initialization between the director and the DSM, the DSM will wait until it receives an Activate message from the director in activating operation 424 before becoming fully functional in operation 426 in a DSM D_Port configuration.

With the DSM model of sharing a domain ID across multiple switches, the director incurs an extra burden to synchronize and coordinate activities amongst the attached DSMs—not only through Federated Management, but also through the Fabric Services. Once the Activate message is received by the DSM, the DSM retrieves additional information from the rest of the fabric before allowing devices—either external devices or, in the case of VSM, internal virtualization devices—to login. The fabric synchronization of this information, along with the subsequent device login, can place a burden on the director if not throttled to some degree. The Activate message allows the Fabric Services on the director to control and smooth out this burden to ensure better performance and more predictable, stable fabric behavior. The Activate message is sent to the DSM via Federated Management, but is controlled by the Fabric Services.

In a standard Fibre Channel fabric, for example, two switches act as independent entities that communicate with standardized protocols. The idea of one switch "Activating" another is unique and fits well with the client-server model of the DSM architecture.

If the intelligent service module is determined to be a domain-sharing leaf switch in determining operation 406, the method proceeds to address distribution operation 428 (which is similar to the address distribution operation 420 described above), Asymmetrical Fabric Services operation 430 (which is similar to Asymmetrical Fabric Services operation 422 described above), and then becomes functional in operation 432 in a standard switch D_Port configuration.

If the intelligent service module is determined to be a standard switch connection in operation 406, however, the method proceeds to standard address distribution operation 434, to standard fabric services operation 436, and then becomes functional in operation 438 in a standard switch E_Port configuration.

Federated Management provides the capability to manage at least one DSM attached to a director as if the DSM was logically part of the director. This capability is achieved by software and firmware that makes use of in-band links between the director and the DSM for communication. Further details of Federated Management are described in U.S. patent application Ser. No. 11/239,954 entitled "Federated Management of Intelligent Service Modules" and filed on Sep. 29, 2005 by Joseph Chamdani et al., which is incorporated by reference herein in its entirety.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
   establishing link parameters for communication over a physical connection between an intelligent service module and a switch; and
   negotiating responsibilities between the intelligent service module and the switch, wherein said negotiating operation comprises exchanging client-server capabilities between the intelligent service module and the switch.

2. The method of claim 1 wherein the negotiating responsibilities operation comprises receiving an ESC frame comprising at least one attribute at the intelligent service module, and receiving an ESC_ACCEPT frame confirming the at least one attribute at the switch.

3. The method of claim 1 wherein the negotiating responsibilities operation comprises the switch requesting client data from the intelligent service module.

4. The method of claim 3 wherein the negotiating responsibilities operation comprises the intelligent service module providing client data to the switch.

5. The method of claim 3 wherein the negotiating responsibilities operation comprises the switch issuing a Request_DSM_Data command.

6. The method of claim 5 wherein the negotiating responsibilities operation comprises the intelligent service module issuing a Request_DSM_Data_Accept command.

7. The method of claim 1 wherein the establishing operation comprises an ELP frame and an ELP_ACCEPT frame.

8. The method of claim 7 wherein the establishing operation further comprises confirming link values at the switch.

9. The method of claim 1 wherein the establishing operation is initiated by the switch.

10. The method of claim 1 wherein the physical connection comprises a fibre channel connection.

11. The method of claim 1 wherein the physical connection comprises at least one of the group comprising an Ethernet communication connection, a serial communication connection, a parallel communication connection, and an SCSI communication connection.

12. The method of claim 1 wherein the physical connection comprises a D_Port state of an inter switch link.

13. The method of claim 12 wherein the intelligent service module comprises a director services module.

14. The method of claim 12 wherein the intelligent service module comprises a domain-sharing leaf switch.

15. The method of claim 1 wherein the physical connection comprises an E_Port state of an inter switch link.

16. The method of claim 15 wherein the intelligent service module comprises a non-domain-sharing leaf switch.

17. The method of claim 2 wherein the at least one attribute comprises a DSM master attribute.

18. The method of claim 2 wherein the at least one attribute comprises an LSSM master attribute.

19. The method of claim 2 wherein the at least one attribute comprises a federated management capable attribute.

20. The method of claim 2 wherein the at least one attribute comprises a domain-sharing capable attribute.

21. The method of claim 2 wherein the attribute is represented by an attribute flag.

22. The method of claim 1 further comprising determining a type of the intelligent service module.

23. The method of claim 1 further comprising determining an ownership status of the intelligent service module.

24. The method of claim 23 wherein, if the ownership status is actively owned by another switch, the method of establishing the physical connection is terminated.

25. The method of claim 23 wherein, if the ownership status is un-owned or previously owned by another switch, the method further comprises querying a user for permission to take ownership of the intelligent service module.

26. The method of claim 23 wherein, if the ownership status of the intelligent service module is actively or previously owned by the switch, establishing federated management of the intelligent service module.

27. The method of claim 1 wherein the intelligent service module shares a logical domain of the switch.

28. The method of claim 1 wherein the intelligent service module shares a proxy domain ID with a second intelligent service module.

29. The method of claim 1 wherein the intelligent service module assumes the link parameters of the switch.

30. The method of claim 1, further comprising activating the intelligent service module.

31. A system comprising:
    a switch module configured to connect to an intelligent service module that initiates an establishment of at least one link parameter at the intelligent service module and initiates a negotiation of responsibilities of a switch and the intelligent service module by issuing at least one attribute to the intelligent service module;
    wherein at least one of the switch module and the intelligent service module includes a processor, firmware, a circuit module, or a storage media.

32. The system of claim 31 wherein the switch module initiates the negotiation of responsibilities by issuing an ESC frame comprising the least one attribute.

33. The system of claim 32 wherein the intelligent service module confirms the at least one attribute by issuing an ESC_ACCEPT frame confirmiing the at least one attribute.

34. The system of claim 31 wherein the switch module initiates the establishment of link parameters by issuing an ELP frame and the intelligent service module confirms the link parameters by issuing an ELP_ACCEPT frame.

35. The system of claim 34 wherein the switch module further confirms the link values.

36. The system of claim 31 wherein the connection comprises a fibre channel connection.

37. The system of claim 31 wherein connection comprises at least one of the group comprising an Ethernet communication connection, a serial communication connection, a parallel communication connection, and an SCSI communication connection.

38. The system of claim 31 wherein the connection comprises a D_Port state of an inter switch link.

39. The system of claim 38 wherein the intelligent service module comprises a director services module.

40. The system of claim 38 wherein the intelligent service module comprises a domain-sharing leaf switch.

41. The system of claim 31 wherein the connection comprises an E_Port state of an inter switch link 42. The system of claim 41 wherein the intelligent service module comprises a non-domain-sharing leaf switch.

43. The system of claim 31 wherein the at least one attribute comprises a DSM master attribute.

44. The system of claim 31 wherein the at least one attribute comprises an LSSM master attribute.

45. The system of claim 31 wherein the at least one attribute comprises a federated management capable attribute.

46. The system of claim 31 wherein the at least one attribute comprises a domain-sharing capable attribute.

47. The system of claim 31 wherein the at least one attribute is represented by an attribute flag of the ESC frame.

48. The system of claim 31 wherein the intelligent service module assumes the link parameters of the switch.

49. A computer-readable storage medium storing computer-readable instructions for execution by a processor to perform a method of establishing a physical connection between an intelligent service module and a switch, wherein the intelligent service module and the switch are coupled by at least one communication connection, the method comprising:

establishing link parameters for communication between the intelligent service module and the switch; and negotiating responsibilities between the intelligent service module and the switch, wherein said negotiating operation comprises exchanging client-server capabilities between the intelligent service module and the switch.

50. The computer-readable storage medium of claim 49 wherein the negotiating responsibilities operation comprises receiving an ESC frame comprising at least one attribute at the intelligent service module, and receiving an ESC_ACCEPT frame confirming the at least one attribute at the switch.

51. The computer-readable storage medium of claim 49 wherein the negotiating responsibilities operation comprises the switch requesting client data from the intelligent service module.

52. The computer-readable storage medium of claim 51 wherein the negotiating responsibilities operation comprises the intelligent service module providing client data to the switch.

53. The computer-readable storage medium of claim 49, further comprising determining a type of the intelligent service module.

54. The computer-readable storage medium of claim 49 wherein the method further comprises determining an ownership status of the intelligent service module.

55. The computer-readable storage medium of claim 49, further comprising activating the intelligent service module.

\* \* \* \* \*